United States Patent [19]

Raabe

[11] 4,111,433

[45] Sep. 5, 1978

[54] TONE ARM CONTROL SYSTEM

[76] Inventor: Herbert P. Raabe, 10121 Lloyd Rd., Potomac, Md. 20854

[21] Appl. No.: 749,566

[22] Filed: Dec. 10, 1976

[51] Int. Cl.² ............................................. G11B 3/10
[52] U.S. Cl. .................................. 274/23 R; 274/1 R
[58] Field of Search ........................... 274/23 R, 9 RA

[56] References Cited

U.S. PATENT DOCUMENTS

| | | | |
|---|---|---|---|
| 2,952,464 | 9/1960 | Stimler | 274/23 R |
| 3,511,509 | 5/1970 | Firestone | 274/9 RA |
| 3,623,734 | 11/1971 | Sakamoto | 274/23 R |
| 3,661,397 | 5/1972 | Worth | 274/15 R |
| 3,744,802 | 7/1973 | Bowerman | 274/23 R |
| 3,830,505 | 8/1974 | Rabinow | 274/23 R |

Primary Examiner—Harry N. Haroian
Attorney, Agent, or Firm—Sughrue, Rothwell, Mion, Zinn and Macpeak

[57] ABSTRACT

The cantilevered stylus is provided with transducers capable of sensing the subsonic spectrum and a constant deflection of the stylus in the horizontal as well as in the vertical plane to provide control voltages for powering a vertical torquer and a horizontal torquer which rotate the tone arm about its elevation and azimuth axes, respectively. A control circuit is provided for the torquers to achieve the necessary two-axes motion for cueing and record changing and to adjust the tracking force.

13 Claims, 6 Drawing Figures

TONE ARM CONTROL SYSTEM

BACKGROUND OF THE INVENTION

1. Field of the Invention

The present invention is directed to a tone arm control system and more specifically to a tone arm control system utilizing a negative feedback swivel drive.

2. Prior Art

Although many improvements have been made in systems for reproducing sound recorded on disc records, technical deficiencies are still present in some of the systems components so that the average system does not reproduce the recorded information with full fidelity. It has been recognized generally that the weakest link in a sound reproducing system is the tone arm and the cartridge mounted thereon. The major objectives which are desired in tone arms and cartridges are maximum fidelity reproduction of the information recorded on the disc and minimum wear of both the record and the tone arm stylus.

Most record players have tone arms mounted for horizontal swinging movement about a vertical pivot axis located beyond the rim of the turntable. Accordingly, the stylus end of the tone arm described an arc as it tracks the record groove with the result that the tone arm is tangent to the groove for a minimal portion of the tracking. The lack of tangency between the stylus and record groove gives rise to tracking distortions and undesirable stylus to groove side pressures. These conditions are undesirable in playing monaural records but especially undesirable when playing stereo records containing separate audio channels on opposite sides of the record grooves. The reason is that not only are distortions introduced but audio balance is disturbed due to the unbalanced side pressures.

Most record players use a so-called off-set arm having a pick-up cartridge at the end thereof. The pick-up cartridge consists of a cantilevered stylus and a transducer to transform the mechanical deflection of the stylus into an electrical waveform. The pick-up arm is generally pivoted for movement about a vertical axis at one side of the record such that the center line of the pick-up cartridge is at an angle to the line connecting the vertical pivot axis and the tip of the cantilevered stylus. When tracking an unmodulated groove, the cantilevered stylus should maintain a 20° angle within the vertical plane of symmetry of the cartridge so that oscillations due to groove modulations deflect the cantilevered stylus symmetrically with respect to this orientation. By proper proportioning this off-set angle relative to the length of the arm and the point at which the pivot is located, the tracking angle can be kept at a very low value with a reasonably long arm. Under these conditions the stylus and record wear as well as distortions of the signal are minimized.

Stylus deflections which are not a part of the groove modulation can be caused by various effects. Foremost is the skating force which is the lateral component of the frictional drag as exerted by the spinning record on the stylus tip. This force varies with the angle between the tone arm radius and the tangent of the record groove. It depends on the stylus shape and tracking force and, to an extent, on the intensity and spectral distribution of the modulated signal. Another source of horizontal deflection is the friction of the tone arm bearing. In imperfectly balanced tone arms gravity forces can act on the stylus when the record player is not on a level surface. Distortions and wear can be caused by tone arm oscillations at the resonance frequency which is determined by the effective mass of the tone arm and the compliance of the cantilevered stylus and lies usually below 15 Hz. These oscillations are easily excited by external vibrations and shocks.

To minimize or ameliorate these effects, better tone arms are balanced, generate an anti-skating force of the anticipated magnitude, have low-friction bearings and damping means for the tone arm movements. However, even dynamically balanced tone arms, which are insensitive to translational shocks, provide no protection against rotational impulses and may lose track with warped records.

In the past various attempts have been made to eliminate tracking errors by the use of special mechanisms to insure tangency. The best known of these mechanisms involves the use of a straight line track on which the pickup rides. The track is so positioned that the stylus path passes through the center of the record. This eliminates the tracking error but such supports unfortunately have much more friction than the pivoted tone arm thus preventing widespread acceptance of this type of mechanism. Various types of mechanical or electrical servo mechanisms for translating the tone arm have been proposed but the majority of these fail to utilize any feedback control for the servo. The patent to Sinnett et al. (U.S. Pat. No. 2,536,892) discloses broadly the concept of using a servo system to effect accurate tracking of a stylus, the control signal for the system being obtained by means of a capacitive plate arrangement associated with the stylus.

Another type of arrangement for eliminating tracking error is disclosed in applicant's own U.S. Pat. No. 3,005,059 wherein the pick-up cartridge is mounted for rotation on a bobbin or cylindrical disc which is rotated in response to the pivotal movement of the tone arm about the vertical pivot post by means of frictionless rolling connecting means.

SUMMARY OF THE INVENTION

The present invention provides a unique phonographic record playback system which utilizes a negative feedback servo drive. The servo drive derives its control signal from suitable transducers associated with the stereo pick-up stylus which will sense the undesirable forces before the tone arm reacts. For example the strain-sensitive transducers can sense a constant deflection of the stylus in the horizontal as well as in the vertical direction to provide two DC voltage signals for controlling servo motors which will generate bi-directional torques about the two rotational axes of the tone arm to assist the tone arm in following the stylus. Strain-sensitive cartridges are readily available, but any cartridge which senses stylus deflection rather than stylus velocity is suitable for the tone arm control system according to this invention.

The present invention provides a unique phonographic record playback system wherein the tone arm having an off-set cartridge at one end thereof is suspended in a two axes gimbal mount having low torque DC motors for pivoting the tone arm about each axis in response to signals received from deflection sensitive transducer means in said cartridge.

The present invention provides a unique phonographic record playback system wherein the tone arm is provided with an off-set cartridge pivoted at one end thereof for rotation about a vertical axis, the tone arm being suspended in a two axes gimbal mount having a pair of low torque DC motors for pivoting the tone arm about each axis and further including frictionless rolling means for imparting rotation to said cartridge about its vertical axis in response to rotation of the tone arm about the vertical axis in said gimbal mount.

The present invention provides a unique phonographic record playback system as described above and further including circuit means for controlling the low torque DC motors to achieve the two-axes motion for cueing and record changing. Circuit means are also provided for said low torque DC motors to adjust the tracking force.

The foregoing and other objects, features and advantages of the invention will be apparent from the following more particular description of preferred embodiments of the invention as illustrated in the accompanying drawings.

DETAILED DESCRIPTION OF THE PREFERRED EMBODIMENTS

Figure 1:
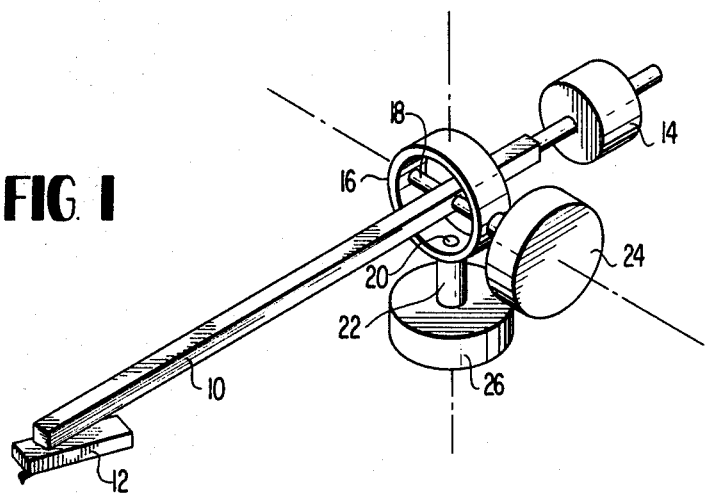
FIG. 1 is a perspective view of a first embodiment of the tone arm control system according to the present invention.

A first embodiment of the tone arm control system according to the present invention is shown in FIG. 1 wherein a tone arm 10 having a pick-up cartridge 12 mounted at one end thereof and a counterweight 14 adjustably mounted at the opposite end thereof is pivotally mounted at an intermediate point by means of two-axes gimbal ring 16. More specifically, the tone arm 10 is connected to a shaft 18 which is journalled for rotation diametrically of the ring 16 which in turn is connected to a vertical shaft 20 journalled for rotation in a vertical support sleeve 22. A first low torque DC motor 24 is secured to the gimbal ring 16 for imparting rotation to the shaft 18 upon which the tone arm 10 is mounted to raise and lower the tone arm. A second low torque DC motor 26 is mounted on any suitable support and imparts rotational movement to the shaft 20 to control the horizontal rotation of the tone arm 10 about the vertical axis which is coincident with the axis of the shaft 20. Both torque motors 24 and 26 are bi-directional and have low moments of inertia. The counterweight 14 could be eliminated if a sufficiently strong current could be generated in the torque motor 24 to provide a simpler and more compact tone arm system. Such an arrangement would also reduce the moment of inertia to one-half.

Figure 4:
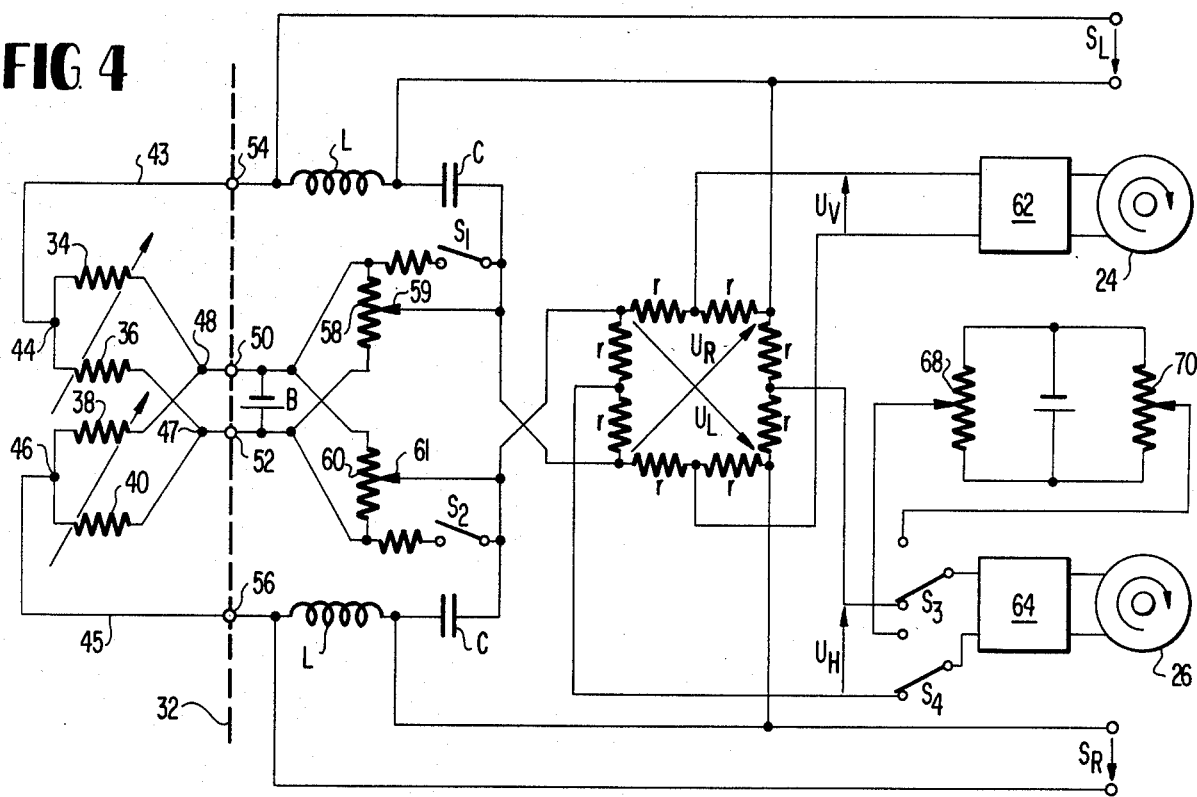
FIG. 4 is a schematic circuit diagram for the tone arm control system according to the present invention.
Figure 5:
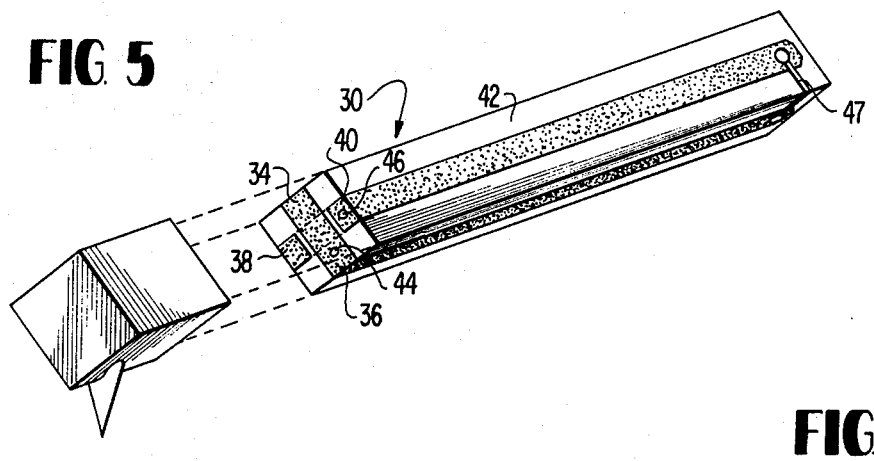
FIG. 5 is a perspective exploded view of a possible embodiment of the stylus cantilever according to the present invention.

The control circuit for the torque motors 24 and 26 is shown in FIG. 4 and utilizes a strain-sensitive cartridge 30 as explained by FIG. 5. The circuit for the cartridge 30 is shown to the left of the dashed line 32 in FIG. 4 and consists of four balanced strain-sensitive resistors 34, 36, 38 and 40. In the example shown in FIG. 5 the strain-sensitive resistors 34, 36, 38 and 40 are in the form of elongated strips of semiconductor film applied to each side of the hollow rectilinear block and which are insulated from each other at the crossover point at one end thereof. A pair of leads 43 and 45 wich are not visible in FIG. 5 extend through the hollow rectilinear block 42 and are connected to the strain-sensitive resistors at terminals 44 and 46, respectively. At the opposite end of the block the resistors 36 and 40 are connected to a common terminal 47 and on the opposite side of the block 42 the resistors 34 and 38 are connected to a common terminal 48.

Deflections due to signals in the left-hand stereo channel cause resistors 34 and 36 to vary in the opposite sense and the same holds true for resistors 38 and 40 which respond to the right-hand channel. To generate a signal voltage each resistor pair is connected in series and a bias current is fed from the DC source B via terminals 50 and 52. Thus, at terminals 54 and 56 the left and right-hand channel signals are available, superimposed to a potential half way between the potentials of terminals 50 and 52. To compensate for this bias potential, the circuitry to the right of the dashed line 32 includes two potentiometers 58 and 60 which are connected to the DC source B so that the potentials of terminals 54 and 56 can be adjusted by the taps 59 and 61 of the potentiometers 58 and 60, respectively. The circuit branch between the cartridge and the potentiometer outputs consists of an inductor L and capacitor C in series. Thus, the potentiometers should be adjusted so that no DC voltage appears across the capacitor terminals when the stylus rests in the groove of a stationary record with the record player placed on a level surface, so that the cantilevered stylus can assume its ideal orientation, assuming that the tracking force is generated by conventional mechanical means such as a weight or a spring.

The series connection of the inductor L and the capacitor C illustrates schematically the objective of dividing the output spectrum into a low-pass portion across the capacitor and a high-pass portion across the inductor. The high-pass portions constitute the signals $S_L$ and $S_R$ of the two stereo channels, while the low-pass portions result from the undesirable stylus deflections and the signals are designated by $U_L$ and $U_R$.

To derive the signals due to the horizontal and vertical stylus deflections, the sum and difference signals, respectively, must be formed. This is achieved in a network consisting of eight identical resistors $r$ connected to form a square. The diagonally opposed connections form the input terminals for the voltages $U_L$ and $U_R$ while the four remaining connections of the resistors form the output terminals with the voltages $U_V$ and $U_H$. It can easily be seen that $$U_V = (U_L - U_R)/2 \text{ and } U_H = (U_L + U_R)/2.$$

The two voltage $U_V$ and $U_H$ are amplifiers 62 and 64 whose outputs power the vertical torque motor 24 and the horizontal torque motor 26, respectively. By proper phasing of the torque motors, which rotate the elevation and aximuth axes of the tone arm, respectively, the cantilevered stylus is pushed back into the ideal orientation regardless of the cause of the deflection. Thus, in theory, the tone arm control system can change the worst tone arm into a superior one.

Another useful feature of the tone arm control system is the possibility for manual control of the torque motors 24 and 26 to achieve the two-axes motion for cueing and record changing and to adjust the tracking force. If the two potentiometers 58 and 60 are readjusted uniformly in opposite directions so that tap 59 moves towards terminal 50 and tap 61 moves towards terminal 52, equal voltages $U_R$ and $U_L$ are generated. The polarity of $U_R$ will be the same as indicated by the arrow, which points from plus to minus, while the polarity of $U_L$ is reversed with respect to the shown arrow. Thus the voltage $U_V$ of equal magnitude as that of $U_R$ or $U_L$ is generated while $U_H$ remains zero. As a result, the tone arm is lifted off the record surface by torque motor 24 and will rest a mechanically set stop (not shown). Likewise, if the two potentiometers 58 and 60 are adjusted in the opposite direction so that tap 59 moves towards terminal 52 and tap 61 moves towards terminal 50, the sign of voltages $U_L, UR_R$ and $U_V$ is reversed and the torque motor 24 will push the tone arm downward, generating a tracking force which can be adjusted by the calibrated ganged potentiometers 58 and 60. Of course, it may be more convenient to leave the potentiometer setting as determined by the desired tracking force and lift the tone arm by operating a switch $S/S_2$ which would unbalance the potentiometer setting in the proper way. After having lifted the tone arm it can be moved horizontally by sliding the taps 59 and 61 of the potentiometers 58 and 60 in the same direction. To stop the tone arm, the potentiometers would have to be set back into the balanced position. Again, this operation could be performed by a three position switch which upsets the balance of the potentiometers in the proper manner. A better control of the horizontal movement can be achieved by switching the respective torque motor by means of switch $S_3/S_4$ which is ganged with switch $S_1/S_2$ into a bridge circuit consisting of two potentiometers 68 and 70 as shown in FIG. 4. Potentiometer 68 can be adjusted manually, while potentiometer 70 is rotated by the torque motor 26. Hence, with proper polarization of the circuit the torque motor 26 would turn potentiometer 70 towards the position of bridge balance. Thus, the tone arm would stop at a position as controlled by the manually set potentiometer 68.

Figure 2:
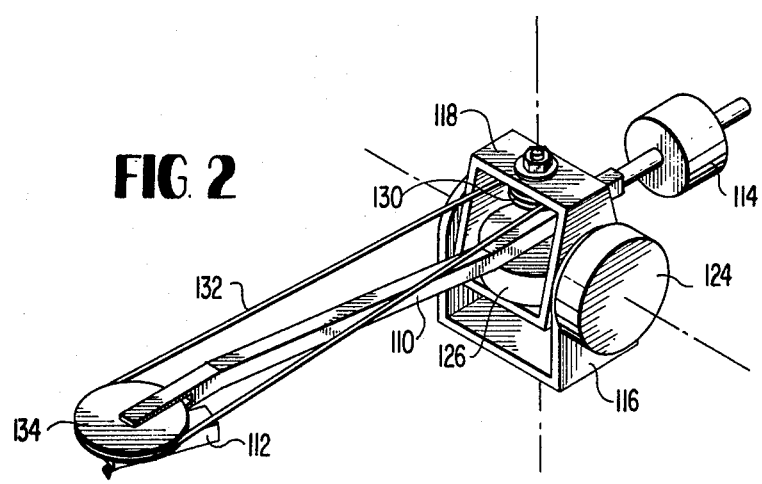
FIG. 2 is a perspective view of a second embodiment of the tone arm control system according to the present invention.

A second embodiment of the tone arm control system according to the present invention is shown in FIG. 2 having a modified gimbal mount and frictionless driving means for imparting a rotation to the pick-up cartridge commensurate with the rotation o the tone arm about the vertical support axis.

As in the previous embodiment the tone arm 110 is provided with a pick-up cartridge 112 at one end and an adjustable counterweight 114 at the opposite end. The gimbal mount is comprised of a U-shaped bracket 116 having a rectangular bracket 118 journalled therein for rotation about a horizontal axis. The frame 118 is oscillated about the horizontal axis by means of the low torque DC motor 124 which is mounted on the U-shaped bracket 116. A second low torque DC motor 126 is mounted within the rectangular frame 118 and the tone arm 110 is connected to the output shaft for rotation of the tone arm in opposite directions about a vertical axis. A cylindrical post 130 is secured within the rectangular frame 118 with the axis thereof in alignment with the axis of the drive shaft of the motor 126. An endless strap 132 extends about the circumference of the post 130 and is secured thereto by any suitable means. The pick-up cartridge 112 is connected to a cylindrical disc 134 which is journalled for rotation about a vertical axis at the end of the tone arm 110. The endless strap 132 also extends about and is secured to the circumference of the cylindrical disc 134 so that upon rotation of the tone arm 110 about the axis of the motor 126 the strap 132 will rotate the disc 134 to maintain the proper tangential orientation of the stylus 136 of the cartridge 112 within the record groove (not shown). The cylindrical disc 134 has a diameter twice as great as that of the post 130. The arrangement of the post 130, strap 132 and disc 134 is in accordance with the principles set forth in applicant's previous U.S. Pat. No. 3,005,059. Another advantage of the embodiment of FIG. 2 over that of FIG. 1 is the lower moment of inertia about the vertical axis because the torque motor 124 does not ride the tone arm.

Figure 3:
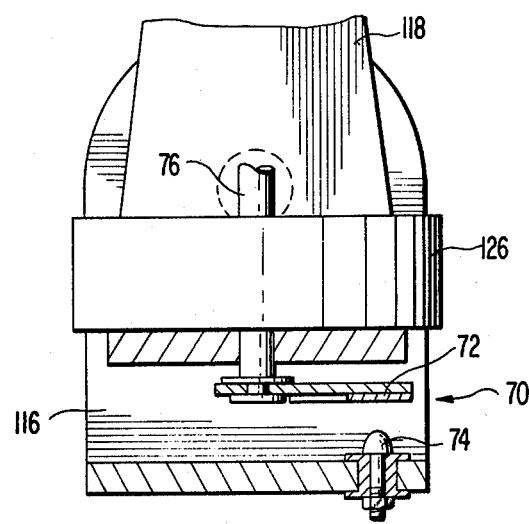
FIG. 3 is a detailed, partial sectional view through the two axes gimbal mount of FIG. 2 showing the arrangement of the potentiometer.

Although the torque motor 126 can overcome the bearing friction, low friction is still desirable to ease the requirements for the torque motors during the record play phase. A potentiometer such as the potentiometer 70 in FIG. 4 would add substantially to the bearing friction due to the friction between the brush and resistive element. A potentiometer construction is illustrated in FIG. 3 whereby the additional friction can be avoided during the playing phase. The potentiometer 70 is mounted on the underside of the frame 118 and consists of resistive element 72 and the brush 74 which is mounted on the base of the U-shaped bracket 116. The resistive element 72 is mounted on the lower extension of the shaft 76 of the torque motor 126. During the playing phase the brush 74 does not contact the resistive element 72 and friction is avoided. When the switch $S_1/S_2/S_3/S_4$ controlling the elevation of the tone arm is activated the frame 118 is tilted in a clockwise direction as viewed in FIG. 3 until the resistive element 72 touches the brush 74 and forms a mechanical stop. Now the bridge circuit disclosed in FIG. 4 is completed and the horizontal position of the tone arm can be controlled in the previously described manner.

Figure 6:
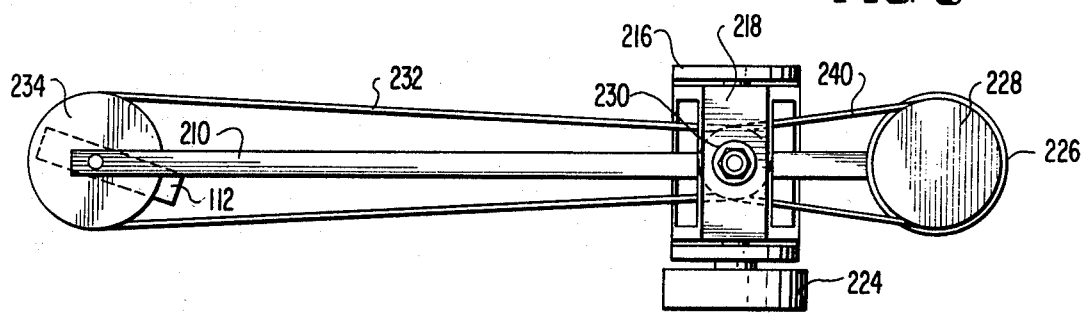
FIG. 6 is a top plan view of a third embodiment of the tone arm control system according to the present invention.

A third embodiment of the tone arm control system according to the present invention is illustrated in FIG. 6 which offers a reduced moment of inertia for the rotation in elevation and enables the use of lower cost brushless torque motors. In FIG. 2 the counterweight 114 is a dead mass which is necessary to balance the tone arm. The torque motor in FIG. 2 must ride on the elevation frame 118 and its mass contributes to the moment of inertia about the elevation axis without participating in the balancing. Thus, in FIG. 6 the tone arm 210 is pivoted for movement in opposite directions about a vertically disposed axis in the frame 218. The frame 218 is pivotally mounted in the U-shaped bracket 216 and is oscillated about its pivot axis by the low torque motor 224 as in the previous embodiment. A post 230 similar to the post 130 in FIG. 2 is provided and a strap 232 extends about the periphery of the post and the periphery of a cylindrical disc 234 to which the cartridge 112 is connected so that the disc 234 will rotate upon pivotal movement of the tone arm 210 so that the attached cartridge 112 will maintain true tangentiality to the record groove.

The system in FIG. 6 requires a drive system to couple the axis of rotation of the torque motor 226 with that of the tone arm 210 in the horizontal plane. An elastic metal belt 240 which may be identical to the belt 232 extends about the periphery of a disc 228 which is driven by the output shaft of the torque motor 226 and about the periphery of the post 230. The diameter of the disc 228 is considerably larger than that of the post 230 so that the angle of rotation of the torque motor 226 will be smaller than that of the tone arm.

As has been pointed out before the torque motors are DC motors whose rotation reverses with the direction of the current. Such motors can be found in numerous applications including toys but they require a brush-communtator system. Aside from the problem of contact and friction between the commutator and brushes, the torque is not uniform and shows a ripple which is undesirable for the present application. For small angular deflection commutators can be avoided. Such brushless torque motors could readily be used for the elevation rotation but the horizontal rotation of the tone arm extends typically over 60°. While expensive brushless torque motors could handle such an angle, an angle of 20° or 30° requires less expensive designs. Therefore, the radii of disc 228 and the post 230 may be 2:1 as shown or 3:1 to achieve the above angular reductions, respectively. A torque motor of limited angular deflection could in principle be designed like a moving coil galvanometer within a permanent magnetic field.

While the invention has been particularly shown and described with reference to preferred embodiments thereof it will be understood by those in the art that the foregoing and other changes in form and details may be made therein without departing from the spirit and scope of the invention.

What is claimed is:

1. A tone arm control system comprising a tone arm, pick-up cartridge means mounted at one end of said tone arm, counterweight means mounted adjacent the opposite end of said tone arm, gimbal means supporting said tone arm intermediate said cartridge means and said counterweight means for rotation about horizontal and vertical axes and servo means for imparting rotation to said tone arm about each of said axes, said pick-up cartridge means having sensing means for sensing undesirable unidirectional and oscillatory forces in the vertical and horizontal directions and transducer means responsive to said forces for providing signals to circuit means for providing feedback control signals to said servo means feedback control signals to circuit means for controlling said servo means thereby to compensate for said undesirable unidirectional forces and oscillatory forces in the vertical and horizontal directions.

2. A tone arm control system as set forth in claim 1 wherein said servo means is comprised of first and second electric motors for rotating said tone arm about each of said axes.

3. A tone arm control system as set forth in claim 2 wherein said sensing means comprises stylus means, said transducer means comprises deflection-sensitive means connected thereto and carried by said cartridge means to provide an output signal in response to forces acting on said stylus and said circuit means operatively connects said deflection-sensitive means to said motors to control the movement of said tone arm.

4. A tone arm control system as set forth in claim 1 wherein said gimbal means is comprised of support means, frame means pivotally mounted on said support means for movement about a vertical axis and horizontally disposed shaft means journalled in said frame means, said tone arm being connected to said shaft means for pivotal movement about a horizontal axis.

5. A tone arm control system as set forth in claim 4 wherein said servo means is comprised of first motor means operatively connected to said frame means for rotating said frame means about said vertical axis and second motor means operatively connected to said shaft means for rotating said tone arm about said horizontal axis.

6. A tone arm control system as set forth in claim 1 wherein said gimbal means is comprised of support means, frame means pivotally mounted on said support means for movement about a horizontal axis, and vertically disposed shaft means carried by said frame means, said tone arm being connected to said shaft means for pivotal movement about a vertical axis.

7. A tone arm control system as set forth in claim 6 wherein said servo means is comprised of first motor means operatively connected to said frame means for rotating said frame means about said horizontal axis and second motor means operatively connected to said shaft means for rotating said tone arm about said vertical axis.

8. A tone arm control system as set forth in claim 7 wherein said second motor means is carried by said frame means and said vertically disposed shaft means is the output shaft of said second motor means.

9. A tone arm control system as set forth in claim 8 wherein said cartridge means is carried by a disc rotatably supported at said one end of said tone arm for rotation about a vertical axis and cylindrical post means mounted on said frame means with the axis thereof disposed in vertical alignment with said vertically disposed shaft means and strap means operatively interconnecting said post means and said disc for imparting rotation to said disc and cartridge as said tone arm rotates about said vertical axis.

10. A tone arm control system as set forth in claim 7 wherein said second motor means is mounted adjacent said opposite end of said tone arm and constitutes said counterweight means, disc means joined by said second motor means for rotation about a vertical axis, cylindrical post means secured to said frame means with the axis thereof disposed orthogonal to the horizontal axis of rotation of said frame means on said support means, said cartridge means being mounted on a second disc journalled for rotation about a vertical axis at said one end of said tone arm and strap means operatively interconnecting said disc and said post for imparing rotation to said tone arm about the vertical axis of said post and additional strap means operatively connecting said post and said second disc for imparting rotation to said cartridge upon rotation of said tone arm about the vertical axis of said post.

11. A tone arm control system as set forth in claim 3 wherein said deflection-sensitive means provide a first output signal indicative of forces related to the engagement of said stylus means with one side of a record groove and a second signal indicative of forces resulting from engagement of said stylus means with the other side of the record groove, said circuit means having means for separating said output signals into first signals constituting the output of the two stereo channels on a record and a second portion representative of said undesirable forces and further means for separating the signals due to said undesirable forces, amplifying said signals and applying said signals to the respective electric motor.

12. A tone arm control system as set forth in claim 11 wherein said circuit means further comprises potentiometer means and switch means for selectively controlling said motor for cueing and record changing and for adjusting the tracking force of said stylus on a record.

13. A tone arm control system as set forth in claim 7 further comprising circuit means for controlling the operation of said first and second motors including potentiometer means associated with the control of said second motor means for rotating said tone arm about said vertical axis when said tone arm is elevated, said potentiometer means including resistive means secured to the axis of said second motor means on said frame means for rotation about said vertical axis and brush means secured to said support means beneath said frame means and normally spaced from said resistive means when said tone arm is pivoted about said horizontal axis into the record playing mode and which is adapted to contact said resistive means when said tone arm is pivoted away from a record surface about said horizontal axis.

* * * * *